United States Patent
Nakamura et al.

(10) Patent No.: US 11,325,609 B2
(45) Date of Patent: May 10, 2022

(54) VEHICLE DRIVING ASSIST SYSTEM

(71) Applicant: SUBARU CORPORATION, Tokyo (JP)

(72) Inventors: Ryota Nakamura, Tokyo (JP); Masayuki Marubashi, Tokyo (JP); Junpei Tokizaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 41 days.

(21) Appl. No.: 17/060,334

(22) Filed: Oct. 1, 2020

(65) Prior Publication Data

US 2021/0101605 A1 Apr. 8, 2021

(30) Foreign Application Priority Data

Oct. 8, 2019 (JP) .............................. JP2019-185042
Jul. 31, 2020 (JP) .............................. JP2020-130805

(51) Int. Cl.
*B60W 40/09* (2012.01)
*B60W 50/14* (2020.01)
*B60W 40/08* (2012.01)

(52) U.S. Cl.
CPC ............ *B60W 40/09* (2013.01); *B60W 50/14* (2013.01); *B60W 2040/0827* (2013.01); *B60W 2040/0863* (2013.01); *B60W 2050/143* (2013.01)

(58) Field of Classification Search
CPC ................. B60W 40/09; B60W 50/14; B60W 2040/0827; B60W 2040/0863; B60W 2050/143; B60W 60/005; B60W 2420/42; B60W 2540/225; B60W 2540/229; B60W 2540/26; B60W 40/08; B60W 60/0059; B60W 2420/403; B60W 2540/223; B60Y 2302/05

See application file for complete search history.

(56) References Cited

U.S. PATENT DOCUMENTS

2007/0120948 A1* 5/2007 Fujioka .................. H04M 1/66 348/14.01
2013/0050816 A1* 2/2013 Kuwahara ............ H04N 13/368 359/462

(Continued)

FOREIGN PATENT DOCUMENTS

JP  11-43009 A  2/1999

*Primary Examiner* — Ryan W Sherwin
(74) *Attorney, Agent, or Firm* — Troutman Pepper Hamilton Sanders LLP

(57) ABSTRACT

A vehicle driving assist system includes an imaging device, an alarm, and a controller. The controller includes a facial recognition unit, an occupant determination unit, and a loss determination unit. The facial recognition unit recognizes at least a part of an occupant's face in first captured images acquired from the imaging device. The occupant determination unit determines a driving state of the occupant on the basis of a second captured image in which at least the part of the face is recognizable, and generate a first alert request if the occupant is unable to drive the vehicle. The loss determination unit generates a second alert request if a third captured image in which at least the part of the face is unrecognizable occurs two or more times. The alarm outputs an alert to the occupant on the basis of the first and second alert requests.

17 Claims, 7 Drawing Sheets

(56) References Cited

U.S. PATENT DOCUMENTS

| | | | | |
|---|---|---|---|---|
| 2014/0309870 A1* | 10/2014 | Ricci | ............... | A61B 7/04 |
| | | | | 701/36 |
| 2015/0189233 A1* | 7/2015 | Carpenter | ............... | H04N 7/15 |
| | | | | 348/14.08 |
| 2016/0224827 A1* | 8/2016 | Haley | ............... | B60W 40/09 |
| 2019/0135294 A1* | 5/2019 | Sato | ............... | G06K 9/3275 |
| 2019/0163997 A1* | 5/2019 | Matsumura | ............... | G06K 9/00926 |
| 2021/0300401 A1* | 9/2021 | Hashimoto | ............... | G06K 9/00845 |

* cited by examiner

VEHICLE DRIVING ASSIST SYSTEM

CROSS-REFERENCE TO RELATED APPLICATIONS

The present application claims priority from Japanese Patent Application No. 2019-185042 filed on Oct. 8, 2019 and Japanese Patent Application No. 2020-130805 filed on Jul. 31, 2020, the entire contents of each of which are hereby incorporated by reference.

BACKGROUND

The technology relates to a vehicle driving assist system.

In regard to vehicles, research has been made on automatic driving that is independent from driving performed by an occupant such as a driver, and on assistance of driving performed by the occupant. The automatic driving is an advanced driving assist.

Research has also been made on an occupant monitoring apparatus for an occupant riding a vehicle such as an automobile. Japanese Unexamined Patent Application Publication No. H11-043009 discloses a technique of monitoring an occupant and outputting an alert, for example.

Enabling organic cooperation between such techniques is expected to enhance convenience and traveling stability of a vehicle such as an automobile.

SUMMARY

An aspect of the technology provides a vehicle driving assist system including an imaging device, an alarm, and a controller. The imaging device is configured to capture and output first captured images of an occupant of a vehicle. The alarm is configured to output an alert to the occupant. The controller is configured to execute control based on the imaging device and the alarm. The controller includes a facial recognition unit, an occupant determination unit, and a loss determination unit. The facial recognition unit is configured to execute a process of recognizing at least a part of a face of the occupant in the first captured images acquired from the imaging device. The occupant determination unit is configured to determine a driving state of the occupant on the basis of a second captured image among the first captured images acquired from the imaging device, and generate a first alert request in a case where the occupant is not in a state of being able to drive the vehicle. The second captured image is a captured image in which the facial recognition unit is able to recognize at least the part of the face of the occupant. The loss determination unit is configured to generate a second alert request in a case where a third captured image occurs two or more times among the first captured images acquired from the imaging device The third captured image is a captured image in which the facial recognition unit is unable to recognize at least the part of the face of the occupant. The alarm is configured to output the alert to the occupant on the basis of the first alert request generated by the occupant determination unit and the second alert request generated by the loss determination unit.

An aspect of the technology provides a vehicle driving assist system including an imaging device, an alarm, and circuitry. The imaging device is configured to capture and output first captured images of an occupant of a vehicle. The alarm is configured to output an alert to the occupant. The circuitry is configured to execute control based on the imaging device and the alarm. The circuitry is further configured to recognize at least a part of a face of the occupant in the first captured images acquired from the imaging device. The circuitry is further configured to determine a driving state of the occupant on the basis of a second captured image among the first captured images acquired from the imaging device. The second captured image is a captured image in which at least the part of the face of the occupant is recognizable. The circuitry is further configured to generate a first alert request in a case where the occupant is determined, on the basis of the driving state of the occupant, as not being in a state of being able to drive the vehicle. The circuitry is further configured to generate a second alert request in a case where a third captured image occurs two or more times among the first captured images acquired from the imaging device. The third captured image is a captured image in which at least the part of the face of the occupant is unrecognizable. The alarm is configured to output the alert to the occupant on the basis of the first alert request and the second alert request.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
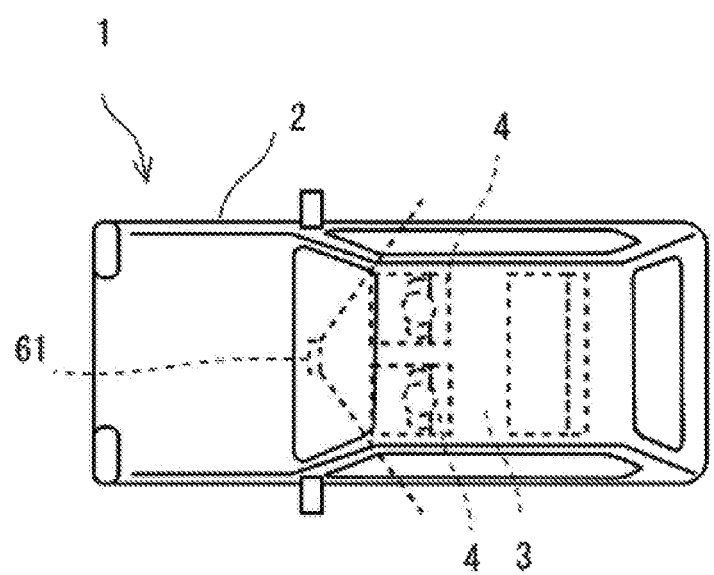
FIG. 1 is an explanatory diagram schematically illustrating a vehicle according to one example embodiment of the technology.

An apparatus that monitors an occupant such as a driver riding a vehicle may, to monitor the occupant, suitably use an imaging device that captures an image of the occupant. A state of the occupant may be determined on the basis of the image captured by the imaging device.

However, in a case of monitoring the state of the occupant on the basis of the capturing of the image of the occupant by the imaging device, the determination made on the basis of the image captured by the imaging device can bring about the following concerns, for example.

Depending on a traveling environment of the vehicle, for example, the occupant's face can be illuminated with strong light, or the inside of the vehicle can become pitch-dark. This can make it difficult for the occupant monitoring apparatus to correctly determine the state of the occupant's face on the basis of the captured image. This can make it difficult for a vehicle driving assist system, which executes control on the basis of a determination result of the occupant monitoring apparatus, to execute control based on correct determination.

Therefore, it is desired for the occupant monitoring apparatus of the vehicle to be able to determine the state of the occupant's face as much as possible even for the captured image as described above. To enable such determination based on images, for example, determination criteria for the state of the occupant's face may be adjusted to make it possible to determine the occupant's face not clearly captured in the captured image as the occupant's face. However, as a result of such adjustment, the determination criteria for the state of the occupant's face is assumed to be looser than the original determination criteria. The adjustment can thus increase the following concerns. For example, the occupant can be incorrectly determined as being in an inappropriate driving state, due to quality of the captured image and the loose determination criteria, even though the occupant is in an appropriate driving state of being able to drive the vehicle. In another example, the occupant can be incorrectly determined as being in an appropriate driving state, due to the quality of the captured image and the loose determination criteria, even though the occupant is not in an appropriate driving state of being able to drive the vehicle.

It is desirable to provide an improved vehicle driving assist system.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 schematically illustrates a vehicle 1 according to an example embodiment of the technology.

The vehicle 1 may be, for example, an automobile as illustrated in FIG. 1. The vehicle 1 may have a body 2 and a vehicle compartment 3 provided at the middle of the body 2. The vehicle compartment 3 may be a space including seats 4 for occupants to sit in. The occupant who rides the vehicle 1, such as a driver, may sit in the seat 4 and operate traveling of the vehicle 1. The vehicle 1 may travel on the basis of automatic driving or manual driving. The vehicle 1 may execute a driving assist in a case where the vehicle 1 travels on the basis of a traveling operation performed by the occupant. The vehicle 1 may assist both of traveling based on the automatic driving and traveling based on the manual driving.

Figure 2:
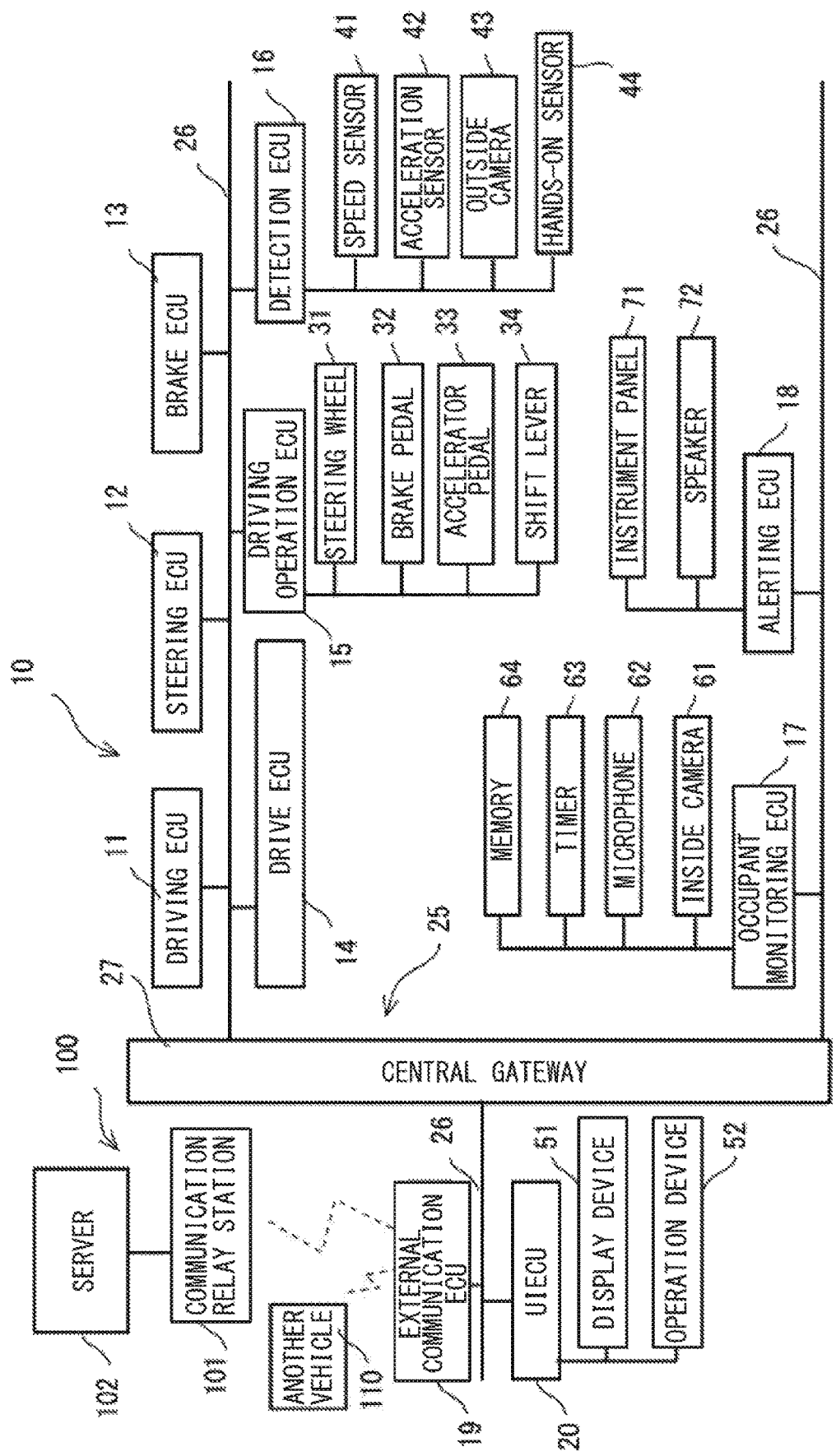
FIG. 2 is an explanatory diagram schematically illustrating a control system of the vehicle illustrated in FIG. 1.

FIG. 2 schematically illustrates a control system 10 of the vehicle 1 illustrated in FIG. 1. FIG. 2 illustrates, together with the control system 10 of the vehicle 1, a traffic information system 100 that communicates with the control system 10.

The vehicle 1 may include a traveling control apparatus 89. The traveling control apparatus 89 may assist the automatic driving that is independent from driving performed by the occupant such as the driver, or the driving performed by the occupant. The vehicle 1 may also include an occupant monitoring apparatus 81. The occupant monitoring apparatus 81 may distinguish an occupant who rides the vehicle 1 and monitor the occupant. These techniques may cooperate with each other organically, which helps to, for example, identify a driver and achieve an advanced driving assist based on the identified driver. This in turn helps to increase convenience and traveling stability of the vehicle 1.

FIG. 2 illustrates two or more controllers included in the control system 10 as represented by control electronic control units (ECUs) incorporated in the respective two or more controllers.

The control system 10 of the vehicle 1 illustrated in FIG. 2 may include: a driving ECU 11; a steering ECU 12; a brake ECU 13; a drive ECU (automatic driving/driving assist ECU) 14; a driving operation ECU 15; a detection ECU 16; an occupant monitoring ECU 17 included in the occupant monitoring apparatus 81; an alerting ECU 18 included in an alerting apparatus 87; an external communication ECU 19; and an UIECU 20. The drive ECU 14 may be configured to control traveling by the automatic driving or the driving assist during the manual driving of the vehicle 1. These control ECUs may be directly coupled to a cable 26 and may be coupled to a central gateway (CGW) 27 via a vehicle network 25. Non-limiting examples of the vehicle network 25 employed in the vehicle 1 may include a controller area network (CAN) and a local interconnect network (LIN). The central gateway 27 may serve as a relay. The control ECUs may communicate with each other on the basis of encrypted data having an own ID that identifies a transmission source and an ID of a destination control ECU. The control ECUs each may transmit data to other control ECUs together in a broadcast fashion, on the basis of encrypted data that does not specify a destination control ECU. The controls ECUs each may receive encrypted data belonging to a destination control ECU identified by the own ID and may use the received encrypted data for a control of the own control ECU. Alternatively, the control ECUs each may receive encrypted data belonging to a destination control ECU identified by a specific ID other than the own ID and may use the received encrypted data for a control of the own control ECU. The central gateway 27 may output received encrypted data to another cable 26, in a case where the encrypted data received from any of the cables 26 is to be transmitted to any control ECU coupled to the other cable 26. With this configuration, the control ECUs illustrated in FIG. 2 are able to transmit and receive the encrypted data mutually.

The driving ECU 11 may receive the encrypted data via the vehicle network 25 to control an unillustrated drive source and an unillustrated transmission provided in the vehicle 1. The drive source may be an engine, a motor, or both. With this configuration, the vehicle 1 is able to accelerate and run.

The steering ECU 12 may receive the encrypted data via the vehicle network 25 to control an unillustrated steering device provided in the vehicle 1. With this configuration, the vehicle 1 is able to change a traveling direction.

The brake ECU 13 may receive the encrypted data via the vehicle network 25 to control an unillustrated brake device provided in the vehicle 1. With this configuration, the vehicle 1 is able to decelerate and stop. The brake ECU 13 may also communicate with the driving ECU 11 via the vehicle network 25 to reduce a rotation of the drive source or to change a gear ratio of the transmission to thereby decelerate the running vehicle 1.

The driving operation ECU 15 may be coupled to operation members including: a steering wheel 31 used to operate traveling of the vehicle 1; a brake pedal 32; an accelerator pedal 33; and a shift lever 34, for example. The driving operation ECU 15 may output the encrypted data to any control ECU such as the drive ECU 14 via the vehicle network 25. The encrypted data outputted from the driving operation ECU 15 may include data on operation of any operation member operated by the occupant.

The detection ECU 16 may be coupled to sensors including a speed sensor 41, an acceleration sensor 42, an outside camera 43, and a hands-on sensor 44, for example. The speed sensor 41 may detect a speed of the vehicle 1. The acceleration sensor 42 may detect an acceleration rate of the vehicle 1. The outside camera 43 may capture images of an outside environment around the vehicle 1. For example, the outside camera 43 may capture images of locations including the front, the side, and the rear of the vehicle 1. The hands-on sensor 44 may be provided on the steering wheel 31, and may detect a change in capacitance or a pressure derived from hands of the occupant who operates the steering wheel 31, for example. The detection ECU 16 may acquire a physical quantity detected by any of the sensors coupled to the detection ECU 16, or a physical quantity detected by any device, as a physical quantity detected in the vehicle 1 upon the traveling of the vehicle 1. The detection ECU 16 may output the acquired physical quantity to any control ECU such as the drive ECU 14 via the vehicle network 25. The detection ECU 16 may also analyze images of the outside environment obtained by the outside camera 43 to detect another mobile body present around the vehicle 1. The detection ECU 16 may output, to any control ECU such as the drive ECU 14 via the vehicle network 25, data on the detected other mobile body.

The external communication ECU 19 may communicate with the outside of the vehicle 1. For example, the external communication ECU 19 may communicate with a communication relay station 101 of the traffic information system 100 to transmit and receive communication data between the external communication ECU 19 and a server 102. The external communication ECU 19 may also transmit and receive communication data, via any communication method such as V2X communication, between the external communication ECU 19 and another vehicle 110 traveling near the vehicle 1, or between the external communication ECU 19 and an unillustrated mobile terminal belonging to a pedestrian, for example. The external communication ECU 19 may perform these communications to receive data such as: navigation data to a destination of the vehicle 1; traffic data; or data on a situation around the vehicle 1. The external communication ECU 19 may output the thus-received data to any control ECU such as the drive ECU 14 via the vehicle network 25.

The UIECU 20 may be coupled to a display device 51 and an operation device 52, for example. The operation device 52 may include a touch panel overlaid on a display screen of the display device 51, and a plurality of keys. The UIECU 20 may receive the encrypted data related to displaying, and may cause the display device 51 to display an image in a case where the UIECU 20 has received the encrypted data. The UIECU 20 may generate data such as navigation data, on the basis of operation that is performed on the operation device 52 in accordance with the displaying carried out on the display device 51. The UIECU 20 may output the data to any control ECU such as the drive ECU 14 via the vehicle network 25.

The drive ECU 14 may switch between the automatic driving and the driving assist to control the traveling of the vehicle 1. The drive ECU 14 may control the traveling of the vehicle 1 on the basis of various pieces of data acquired via the vehicle network 25. For example, upon the automatic driving, the drive ECU 14 may output control data to the driving ECU 11, the steering ECU 12, and the brake ECU 13 to cause the vehicle 1 to travel to the destination in accordance with the navigation data while confirming safety around the vehicle 1. Upon the drive assist, the drive ECU 14 may output control data to the driving ECU 11, the steering ECU 12, and the brake ECU 13 on the basis of the data on operation of any operation member operated by the occupant. The control data outputted upon the drive assist may be based on an amount of operation of any operation member that has been adjusted in accordance with, for example, safety around the vehicle 1.

The occupant monitoring ECU 17 may be coupled to an inside camera 61, a microphone 62, a timer 63, and a memory 64.

The inside camera 61 may be provided in the vehicle compartment 3 and may capture an image of the inside of the vehicle 1. The inside camera 61 may be provided on an inner surface of the vehicle compartment 3. For example, the inside camera 61 may be provided on a dashboard provided in front of the occupant as illustrated in FIG. 1. This configuration allows the occupant such as the driver riding the vehicle 1 to be captured in the image captured by the inside camera 61. The inside camera 61 may be a wide-angle camera or a 360-degree camera in a case where an image of the inside of the vehicle 1 as a whole is to be captured. The inside camera 61 may repeatedly capture an image of the occupant in the vehicle compartment 3 at a predetermined cycle.

The microphone 62 may record a sound of the inside of the vehicle 1.

The timer 63 may measure a timing and a time length.

The memory 64 may store, for example, a program intended for monitoring an occupant and setting data.

The occupant monitoring ECU 17 may load the program from the memory 64 and execute the program. Thus, the occupant monitoring ECU 17 may serve as a controller of the occupant monitoring apparatus 81.

The occupant monitoring ECU 17 serving as the controller of the occupant monitoring apparatus 81 may monitor the occupant such as the driver riding the vehicle 1, on the basis of the image captured by the inside camera 61 and the sound recorded by the microphone 62.

For example, the occupant monitoring ECU 17 may identify an occupant riding the vehicle 1 on the basis of the image captured by the inside camera 61.

The occupant monitoring ECU 17 may output setting data of the vehicle 1 for the identified occupant to any control ECU such as the drive ECU 14 via the vehicle network 25.

The occupant monitoring ECU 17 may monitor a state of the identified occupant or operations manager such as the driver riding the vehicle 1, and generate an alert request on an as-needed basis. The occupant monitoring ECU 17 may output the alert request via the vehicle network 25. The occupant monitoring ECU 17 may determine dozing on the basis of a degree of opening of an eye of the occupant, for example. The occupant monitoring ECU 17 may determine looking-aside on the basis of a direction of a face or the eye of the occupant, for example. In a case where the occupant is determined as dozing or looking aside, the occupant monitoring ECU 17 may generate and output an alert request.

The alerting ECU 18 may be coupled to an instrument panel 71 and a speaker 72.

The instrument panel 71 may be provided on the inner surface of the vehicle compartment 3. For example, the instrument panel 71 may be provided on the dashboard provided in front of the occupant. The instrument panel 71 may include a liquid crystal panel that displays an alert, and a light-emitting device.

The speaker 72 may be provided on the inner surface of the vehicle compartment 3. For example, the speaker 72 may be provided on a door, the dashboard, a pillar, or a roof.

Upon output of an alert request to the vehicle network 25, for example, the alerting ECU 18 may acquire the alert request, and output, via the instrument panel 71 and the speaker 72, an alert sound, an alert display, and an alert message corresponding to the alert request. This enables the occupant in the vehicle compartment 3 to recognize an alert issued by the vehicle 1, and address the alert.

The occupant monitoring apparatus 81 may monitor the occupant such as the driver riding the vehicle 1. To monitor a riding state of the occupant, the occupant monitoring apparatus 81 may often use the inside camera 61 that captures an image of the occupant. In this case, the occupant monitoring ECU 17 of the occupant monitoring apparatus 81 may determine the state of the occupant on the basis of the image captured by the inside camera 61.

However, in a case of determining the state of the occupant on the basis of the capturing of the image of the occupant by the inside camera 61, the determination made on the basis of the image captured by the inside camera 61 can bring about the following concerns, for example.

Depending on a traveling environment of the vehicle 1, for example, the occupant's face can be illuminated with strong light, or the inside of the vehicle 1 can become pitch-dark. This can make it difficult for the occupant monitoring ECU 17 to correctly determine the state of the occupant on the basis of the captured image. As an example, assume a case of determining a state such as the direction or the degree of opening of the eye, for example, whose area is small in the captured image. In this case, if the occupant's face is illuminated with strong light or the inside of the vehicle becomes pitch-dark, it tends to become difficult to determine the state of the eye, for example, on the basis of the captured image. This can make it difficult for the vehicle 1, which executes alerting and control on the basis of a determination result of the occupant monitoring ECU 17, to execute appropriate alerting and control based on correct determination.

Therefore, it is desired for the occupant monitoring ECU 17 to determine the state of the occupant as much as possible even for an inappropriate captured image as described above. To enable such determination based on images, the state of the occupant may be determined by determining the face or the eye, for example, of the occupant not clearly captured in the captured image, as the face or the eye of the occupant. Criteria for the occupant monitoring ECU 17 to determine the state of the occupant may accordingly be adjusted to looser determination criteria, as compared with a case of making the determination on the basis of the face or the eye of the occupant clearly captured in the captured image. Therefore, in determination based on such adjustment, the adjustment can increase the following concerns. For example, the occupant can be incorrectly determined as being in an inappropriate driving state, even though the occupant is in an appropriate driving state of being able to drive the vehicle 1. In another example, the occupant can be incorrectly determined as being in an appropriate driving state, even though the occupant is not in an appropriate driving state of being able to drive the vehicle 1.

Thus, it is desired for the occupant monitoring ECU 17 of the occupant monitoring apparatus 81 to appropriately determine the riding state of the occupant on the basis of image captured by the inside camera 61, even if the captured image is of poor quality, to enable the vehicle 1 to appropriately execute alert and control.

It is desired for a driving assist system 80 of the vehicle 1 to prevent excessive output of alerts to, for example, prevent a predetermined motion or operation, such as hands-on, from being frequently or excessively requested of the occupant on the basis of incorrect determination or too sensitive determination during the automatic driving.

What is desired is further improvement in the driving assist system 80 of the vehicle 1.

Figure 3:
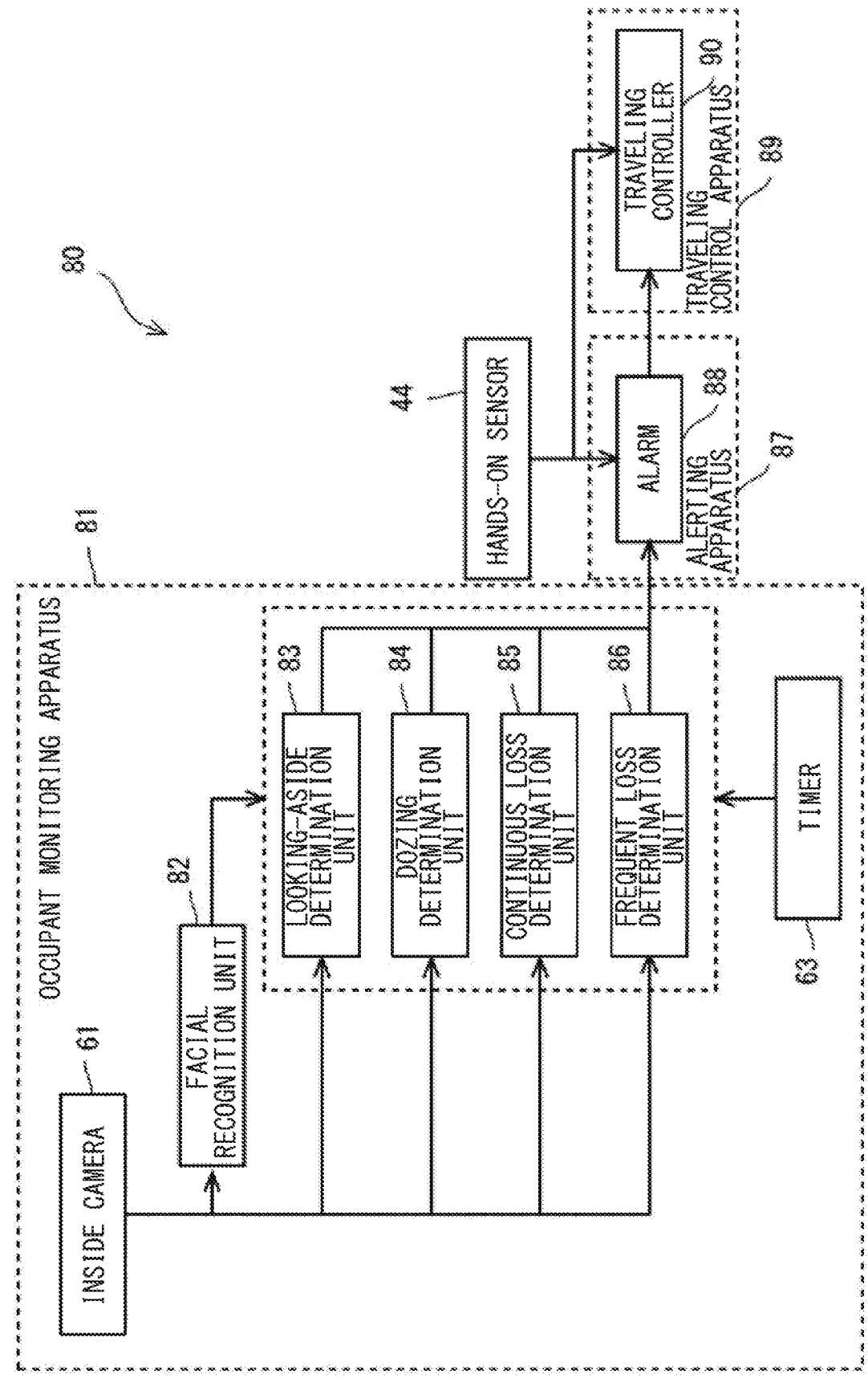
FIG. 3 is an explanatory diagram illustrating a vehicle driving assist system implemented by the control system illustrated in FIG. 2.

FIG. 3 illustrates the driving assist system 80 included in the vehicle 1 and implemented by the control system 10 illustrated in FIG. 2.

The driving assist system 80 illustrated in FIG. 3 may include the occupant monitoring apparatus 81, the alerting apparatus 87, the traveling control apparatus 89, and the hands-on sensor 44. The occupant monitoring apparatus 81, the alerting apparatus 87, and the traveling control apparatus 89 may be coupled to each other via the vehicle network 25.

The hands-on sensor 44 may be configured to detect a change in capacitance or a pressure derived from hands of the occupant who operates the steering wheel 31. This makes it possible to detect whether the occupant is in a state of being able to place the hands on and operate the steering wheel 31, which is to be operated by the occupant to manually drive the vehicle 1. In one embodiment, the hands-on sensor 44 may serve as a "detector".

The occupant monitoring apparatus 81 may include a facial recognition unit 82, a looking-aside determination unit 83, a dozing determination unit 84, a continuous loss determination unit 85, and a frequent loss determination unit 86. The facial recognition unit 82, the looking-aside determination unit 83, the dozing determination unit 84, the continuous loss determination unit 85, and the frequent loss determination unit 86 may be implemented by the occupant monitoring ECU 17 executing the program. FIG. 3 illustrates, in addition to these units, the inside camera 61 and the timer 63. In one embodiment, the facial recognition unit 82, the looking-aside determination unit 83, the dozing determination unit 84, the continuous loss determination unit 85, and the frequent loss determination unit 86 may serve as a "controller". In one embodiment, the looking-aside determination unit 83 and the dozing determination unit 84 may serve as an "occupant determination unit". In one embodiment, the continuous loss determination unit 85 and the frequent loss determination unit 86 may serve as a "loss determination unit". In one embodiment, the continuous loss determination unit 85 may serve as a "first loss determination unit". In one embodiment, the frequent loss determination unit 86 may serve as a "second loss determination unit".

The inside camera 61 may repeatedly capture an image of the occupant in the vehicle compartment 3 at a predetermined cycle and output the captured image. In one embodiment, the inside camera 61 may serve as an "imaging device".

The facial recognition unit 82 may execute a process of recognizing the face or a part of the face, such as the eye, a nose, or a mouth, of the occupant, on the basis of the image captured by the inside camera 61. The facial recognition unit 82 may check, through a simple process, whether the captured image is usable for determination to be made by the subsequent looking-aside determination unit 83 and dozing determination unit 84. In another example, the facial recognition unit 82 may recognize the face, the eye, the nose, or the mouth of the occupant in the captured image by determination criteria stricter than those for the subsequent looking-aside determination unit 83 and dozing determination unit 84. Thus, at least in a case where, for example, a white part and a non-white part are not captured in an image of the eye, included in the captured image, to be used for the determination by the subsequent looking-aside determination unit 83 and dozing determination unit 84, the facial recognition unit 82 may regard the captured image as a captured image on the basis of which the driving state of the occupant is undeterminable. Alternatively, the facial recognition unit 82 may regard the captured image as a captured image on the basis of which the subsequent looking-aside determination unit 83 and dozing determination unit 84 can find it difficult to make the determination. In a case where the face, the eye, the nose, or the mouth of the occupant is appropriately recognizable in the captured image, the facial recognition unit 82 may output an availability signal indicating that the occupant has been successfully recognized. In a case of unsuccessful recognition, the facial recognition unit 82 may output an unavailability signal.

In a case where the availability signal is received, the looking-aside determination unit 83 may determine whether the occupant is looking aside on the basis of the image captured by the inside camera 61. For example, the looking-aside determination unit 83 may extract a portion including the face or the eye of the occupant in the captured image, and determine the direction of the face or the eye of the occupant on the basis of the extracted partial image. In this case, the looking-aside determination unit 83 may perform the extraction or the determination by using a recognition result of the preceding facial recognition unit 82, or may perform the extraction and the determination through its own process from the beginning. In a case where the face or the eye of the occupant is not directed to the front, for example, which is the traveling direction of the vehicle 1, the looking-aside determination unit 83 may output an alert request regarding looking-aside. The looking-aside determination unit 83 may thus determine looking-aside on the basis of the state of the face or the state of the eye in the captured image.

In a case where the availability signal is received, the dozing determination unit 84 may determine whether the occupant is dozing on the basis of the image captured by the inside camera 61. For example, the dozing determination unit 84 may extract a portion including the eye of the occupant in the captured image, and determine the degree of opening of the eye of the occupant on the basis of the extracted partial image. In this case, the dozing determination unit 84 may perform the extraction or the determination by using the recognition result of the preceding facial recognition unit 82, or may perform the extraction and the determination through its own process from the beginning. In a case where the degree of opening of the eye of the occupant is equal to or less than a predetermined threshold, the dozing determination unit 84 may output an alert request regarding dozing. The dozing determination unit 84 may thus determine dozing on the basis of the state of the eye in the captured image.

Thus, the looking-aside determination unit 83 and the dozing determination unit 84 may determine whether the occupant is in an inappropriate driving state, such as looking-aside or dozing, on the basis of the captured image in which the face, for example, of the occupant is recognizable, and generate and output an alert request in a case where the occupant is in the inappropriate driving state. The inappropriate driving state may refer to, for example, the occupant not being in a state of a driving posture to be taken in a case of operating the traveling of the vehicle 1, or not being in a state defined as being able to immediately operate the traveling.

The continuous loss determination unit 85 may count, for example, the number of images captured by the inside camera 61 in a state in which the availability signal has not been received. The count value may be recorded in the memory 64. Upon occurrence of an image captured by the inside camera 61 in a state in which the availability signal has been received, the continuous loss determination unit 85 may reset the count value. This enables the continuous loss determination unit 85 to count the number of consecutive two or more captured images in the state in which the availability signal has not been received. It is to be noted that the state in which the availability signal has not been received may include a case where no captured image has been outputted at a timing when the inside camera 61 is to output a captured image. One reason for this is that the facial recognition unit 82 is unable to output the availability signal also in this case. If the count value indicating the number of consecutive captured images in the state in which the availability signal has not been received becomes equal to or greater than a threshold number of times corresponding to a predetermined continuous loss determination period, the continuous loss determination unit 85 may output an alert request regarding inability to correctly determine looking-aside or dozing due to the continuously inappropriate captured images. The continuous loss determination period may be measured by the timer 63. The continuous loss determination unit 85 may thus generate and output an alert request if a state in which the facial recognition unit 82 is unable to recognize the face in two or more captured images to be outputted from the inside camera 61 occurs continuously and repeatedly for a predetermined number or more or a predetermined period or more.

The frequent loss determination unit 86 may count, for example, the number of images captured by the inside camera 61 in a state in which the availability signal has not been received. The count value may be recorded in the memory 64. Even if an image captured by the inside camera 61 in a state in which the availability signal has been received occurs, the frequent loss determination unit 86 may keep counting from the current value, without resetting the count value. This enables the frequent loss determination unit 86 to, even in a case where the state in which the availability signal has not been received occurs intermittently, count the number of two or more captured images in the state in which the availability signal has not been received, throughout a period in which the state occurs intermittently. It is to be noted that the state in which the availability signal has not been received may include a case where no captured image has been outputted at a timing when the inside camera 61 is to output a captured image. If the count value in the most recent frequent loss determination period becomes equal to or greater than a threshold number of times, the frequent loss determination unit 86 may output an alert request regarding inability to correctly determine looking-aside or dozing due to the intermittently inappropriate captured images. The most recent frequent loss determination period may be measured by the timer 63. The frequent loss determination unit 86 may thus generate and output an alert request if a state in which the facial recognition unit 82 is unable to recognize the face in two or more captured images to be outputted from the inside camera 61 occurs intermittently and repeatedly for the most recent predetermined number or more or the most recent predetermined cumulative period or more.

Thus, in a case where the facial recognition unit 82 is repeatedly unable to recognize the face in two or more captured images continuously outputted from the inside camera 61, the continuous loss determination unit 85 and the frequent loss determination unit 86 may generate and output an alert request.

The alerting apparatus 87 may include an alarm 88. The alarm 88 may be implemented by the alerting ECU 18 executing a program.

Upon reception of an alert request from the occupant monitoring apparatus 81, the alarm 88 may determine whether the occupant is in a state of being able to operate the operation member, on the basis of a detection value of the hands-on sensor 44. In a case where the occupant is undeterminable as being in the state of being able to operate the operation member, the alarm 88 may select an alert corresponding to the alert request and output the alert. For example, the alarm 88 may output, to the occupant on the basis of the alert request, an alert for correction of the inappropriate driving state, such as looking-aside or dozing. The alert may be outputted from the speaker 72 and the instrument panel 71 to the occupant. For example, the alert may be a hands-on alert for correction of the inappropriate driving state, such as looking-aside or dozing. In a case where the occupant is determinable as being in the state of being able to operate the operation member, the alarm 88 may refrain from outputting an alert. This makes it possible to reduce unnecessary output of alerts.

The traveling control apparatus 89 may include a traveling controller 90. The traveling controller 90 may be implemented by the drive ECU 14 executing a program.

The traveling controller 90 may control the traveling of the vehicle 1 during the automatic driving and the manual driving of the vehicle 1. For example, the traveling controller 90 may control the traveling of the vehicle 1 independent from an operation performed by the occupant, during the automatic driving of the vehicle 1. After the output of an alert by the alerting apparatus 87, or after the output of an alert request by the occupant monitoring apparatus 81, the traveling controller 90 may determine whether the occupant is in the state of being able to operate the operation member, on the basis of the detection value of the hands-on sensor 44. In a case where the occupant is undeterminable as being in the state of being able to operate the operation member, the traveling controller 90 may execute predetermined traveling control of the vehicle 1 in accordance with what is indicated by the alert. For example, the traveling controller 90 may decelerate the vehicle 1 that is traveling, and cause the vehicle 1 to stop at a relatively safe place such as a road shoulder.

Figure 4:
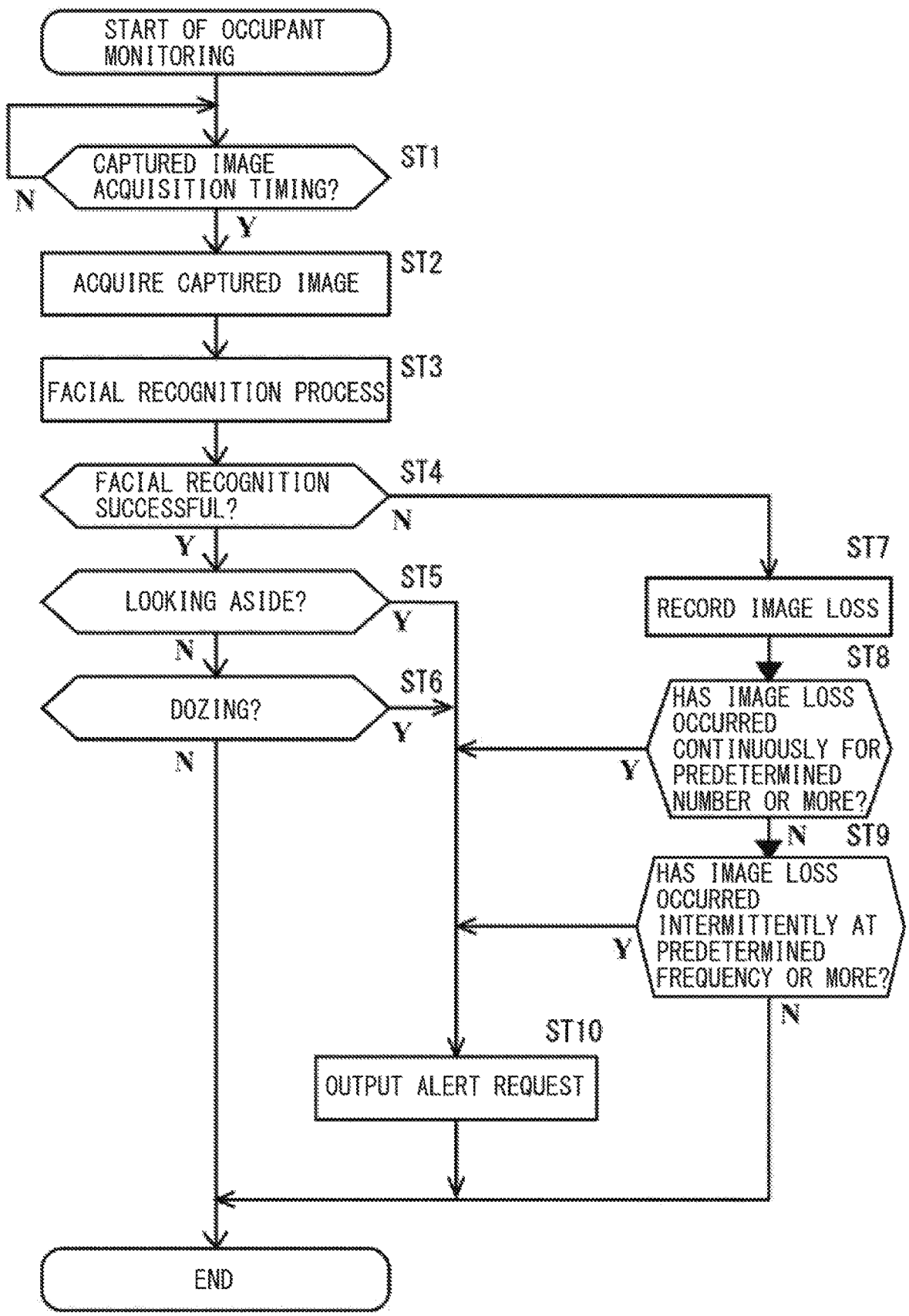
FIG. 4 is a flowchart illustrating a control flow of an occupant monitoring apparatus illustrated in FIG. 3.

FIG. 4 is a flowchart illustrating a control flow of the occupant monitoring apparatus 81 illustrated in FIG. 3.

The occupant monitoring ECU 17 may repeatedly execute a process illustrated in FIG. 4.

In step ST1, the occupant monitoring ECU 17 may determine whether a captured image acquisition timing at which the inside camera 61 is to output a captured image has arrived. The occupant monitoring ECU 17 may determine whether the captured image acquisition timing has arrived, on the basis of a timing or a time length elapsed from the previous acquisition timing, which is measured by the timer 63. If the captured image acquisition timing has not arrived, the occupant monitoring ECU 17 may repeat the process of determining whether the captured image acquisition timing has arrived. Upon the arrival of the captured image acquisition timing, the occupant monitoring ECU 17 may advance the process to step ST2.

In step ST2, the occupant monitoring ECU 17 may acquire a new captured image outputted by the inside camera 61.

In step ST3, the occupant monitoring ECU 17 may, as the facial recognition unit 82, execute a process of recognizing the face or a part of the face, such as the eye, the nose, or the mouth, of the occupant, in the acquired new captured image. For the eye, for example, the occupant monitoring ECU 17 may execute a process of recognizing the white part and the non-white part of the eye. In some cases, the face or a part of the face, such as the eye, the nose, or the mouth, of the occupant is not captured to be favorably distinguishable in the captured image, due to an imaging environment, for example. In some other cases, the occupant monitoring ECU 17 is unable to acquire a captured image at the captured image acquisition timing, due to a malfunction of the inside camera 61, for example. The occupant monitoring ECU 17 may execute the process of recognizing the occupant, taking these situations into account. If the face or a part of the face, such as the eye, the nose, or the mouth, of the occupant is recognizable in the captured image, the occupant monitoring ECU 17 may output an availability signal indicating that the occupant has been successfully recognized, to the looking-aside determination unit 83, the dozing determination unit 84, the continuous loss determination unit 85, and the frequent loss determination unit 86, which are involved in a subsequent process described below. Otherwise, the occupant monitoring ECU 17 may refrain from outputting an availability signal. Alternatively, the occupant monitoring ECU 17 may output an unavailability signal. The availability signal and the unavailability signal may be outputted, for example, by being recorded in the memory 64 or by being directly transmitted via inter-program communication.

In step ST4, the occupant monitoring ECU 17 may, as the facial recognition unit 82, determine whether the face or a part of the face, such as the eye, the nose, or the mouth, of the occupant has been successfully recognized in the captured image. If the face or a part of the face, such as the eye, the nose, or the mouth, of the occupant has been successfully recognized in the captured image, the occupant monitoring ECU 17 may advance the process to step ST5.

If the face, for example, of the occupant has not been successfully recognized, the occupant monitoring ECU 17 may advance the process to step ST7.

In step ST5, the occupant monitoring ECU 17 may, as the looking-aside determination unit 83 that has received the availability signal, determine whether the occupant is looking aside on the basis of the image captured by the inside camera 61. If the occupant is determined as looking aside, the occupant monitoring ECU 17 may advance the process to step ST10. If the occupant is not determined as looking aside, the occupant monitoring ECU 17 may advance the process to step ST6.

In step ST6, the occupant monitoring ECU 17 may, as the dozing determination unit 84 that has received the availability signal, determine whether the occupant is dozing on the basis of the image captured by the inside camera 61. If the occupant is determined as dozing, the occupant monitoring ECU 17 may advance the process to step ST10. If the occupant is not determined as dozing, the occupant monitoring ECU 17 may end the process illustrated in FIG. 4.

It is to be noted that the occupant monitoring ECU 17 may execute the dozing determination in step ST6 before the looking-aside determination in step ST5.

In step ST7, the occupant monitoring ECU 17 may record, in the memory 64, an image loss in which facial recognition by the facial recognition unit 82 has been unsuccessful. For example, the occupant monitoring ECU 17 may count the number of consecutive captured images serving as loss images in which facial recognition has been unsuccessful, and record the count value in the memory 64. In another example, the occupant monitoring ECU 17 may record and accumulate, in the memory 64, the acquisition timings of the captured images serving as the loss images in which facial recognition by the facial recognition unit 82 has been unsuccessful.

In step ST8, the occupant monitoring ECU 17 may, as the continuous loss determination unit 85 that has not received the availability signal, determine whether the loss image in which facial recognition by the facial recognition unit 82 has been unsuccessful has continuously occurred for the predetermined number, corresponding to the preset continuous loss determination period, or more.

The occupant monitoring ECU 17 may compare the number of loss images that have continuously occurred most recently with the determination threshold corresponding to the continuous loss determination period. If the number of loss images that have continuously occurred most recently is equal to or greater than the determination threshold, the occupant monitoring ECU 17 may advance the process to step ST10. Otherwise, the occupant monitoring ECU 17 may advance the process to step ST9.

In step ST9, the occupant monitoring ECU 17 may, as the frequent loss determination unit 86 that has not received the availability signal, determine whether the loss image in which facial recognition by the facial recognition unit 82 has been unsuccessful has occurred intermittently at a predetermined frequency or more in the preset most recent frequent loss determination period. The occupant monitoring ECU 17 may compare the count value of loss images in the most recent frequent loss determination period with the threshold for the number of occurrence of loss images preset for the frequent loss determination period. If the count value of loss images in the most recent frequent loss determination period is equal to or greater than the threshold for the number of occurrence, the occupant monitoring ECU 17 may advance the process to step ST10. Otherwise, the occupant monitoring ECU 17 may end the process illustrated in FIG. 4.

In step ST10, the occupant monitoring ECU 17 may output a hands-on alert request to the alerting ECU 18 and the drive ECU 14 via the vehicle network 25. The occupant monitoring ECU 17 may output the alert request such that a cause of the alert request is distinguishable.

Figure 5:
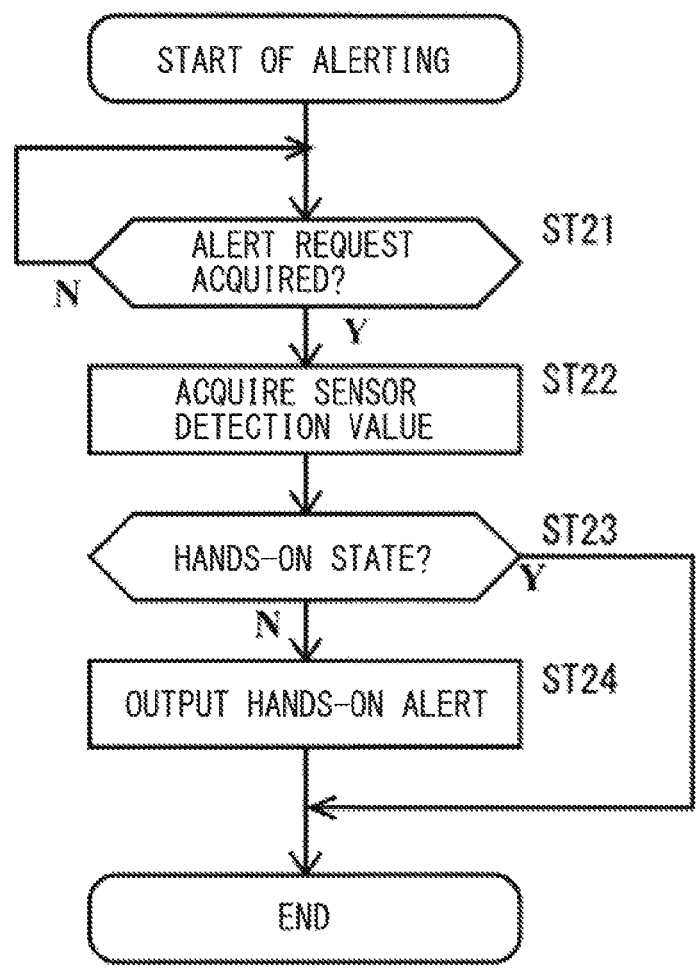
FIG. 5 is a flowchart illustrating a control flow of an alerting apparatus illustrated in FIG. 3.

FIG. 5 is a flowchart illustrating a control flow of the alerting apparatus 87 illustrated in FIG. 3.

The alerting ECU 18 may, as the alarm 88 of the alerting apparatus 87, repeatedly execute a process illustrated in FIG. 5.

In step ST21, the alerting ECU 18 may determine whether a hands-on alert request has been acquired from the occupant monitoring apparatus 81. If the alert request has not been acquired, the alerting ECU 18 may repeat the process of determining whether the hands-on alert request has been acquired. Upon acquisition of the alert request, the alerting ECU 18 may advance the process to step ST22.

In step ST22, the alerting ECU 18 may acquire the detection value of the hands-on sensor 44. If the steering wheel 31 is gripped by the hands of the occupant, the detection ECU 16 may output hands-on as the detection value of the hands-on sensor 44. If the steering wheel 31 is not gripped by the hands of the occupant, the detection ECU 16 may output hands-off as the detection value of the hands-on sensor 44. The alerting ECU 18 may acquire either of these sensor detection values.

In step ST23, the alerting ECU 18 may determine whether the occupant is in a hands-on state of being able to start a manual operation immediately, on the basis of the sensor detection value acquired in step ST22. If the occupant is in the hands-on state, the alerting ECU 18 may end the process illustrated in FIG. 5.

The alerting ECU 18 may end the process illustrated in FIG. 5, without outputting a hands-on alert on the basis of the alert request. If the occupant is not in the hands-on state, the alerting ECU 18 may advance the process to step ST24.

In step ST24, the alerting ECU 18 may output a hands-on alert. The alerting ECU 18 may output, to the drive ECU 14 via the vehicle network 25, a notification indicating that the hands-on alert has been outputted.

Figure 6:
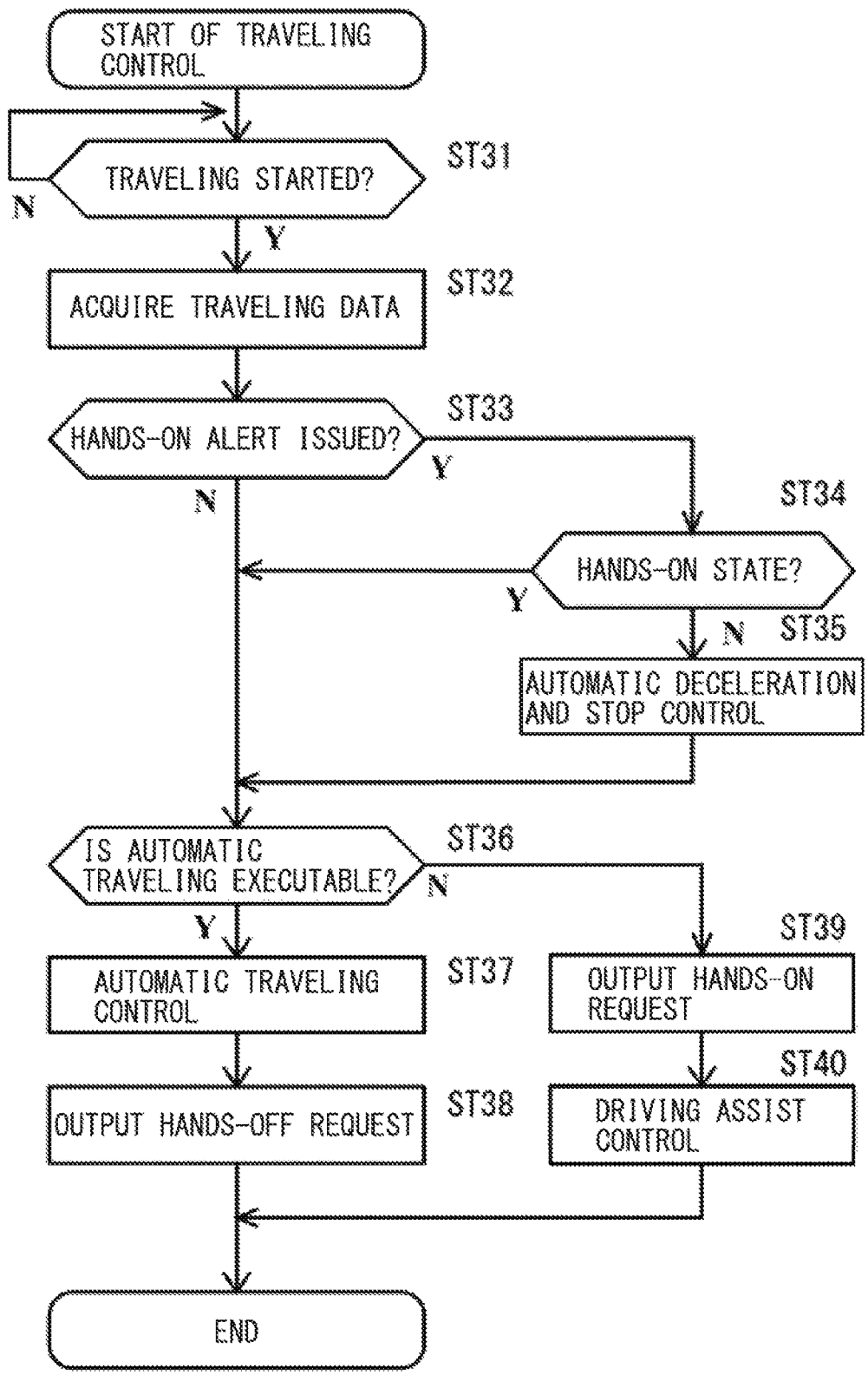
FIG. 6 is a flowchart illustrating a control flow of a traveling control apparatus illustrated in FIG. 3.
Figure 7A:
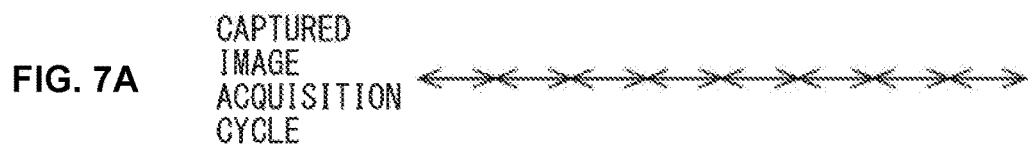
FIGS. 7A-7F are explanatory diagrams illustrating an example of a process of generating an alert request in a case where a captured image in which a face is unrecognizable has repeatedly occurred.
Figure 7B:
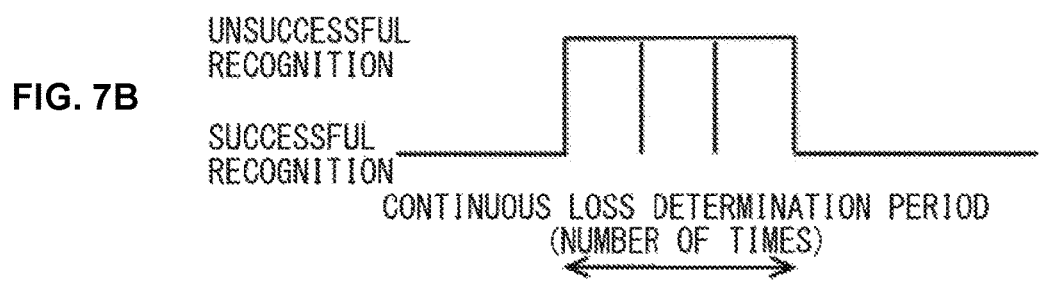
Figure 7C:
Figure 7D:
Figure 7E:
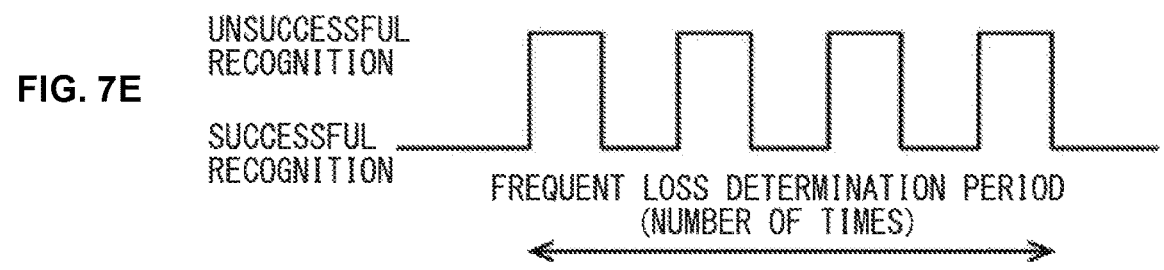
Figure 7F:

FIG. 6 is a flowchart illustrating a control flow of the traveling control apparatus 89 illustrated in FIG. 3.

The drive ECU 14 may, as the traveling controller 90 of the traveling control apparatus 89, repeatedly execute a process illustrated in FIG. 6.

In step ST31, the drive ECU 14 may determine whether the vehicle 1 has started traveling. If the vehicle 1 has not started traveling, the drive ECU 14 may repeat the process of determining whether the vehicle 1 has started traveling. If the vehicle 1 has started traveling, the drive ECU 14 may advance the process to step ST32.

In step ST32, the drive ECU 14 may acquire traveling data. The traveling data may include, for example, whether a hands-on alert request has been outputted by the occupant monitoring apparatus 81, whether a hands-on alert has been outputted by the alerting apparatus 87, the detection value of the hands-on sensor 44, and data to be used to determine whether automatic traveling is executable. The data to be used to determine whether automatic traveling is executable may include, for example, data on the state of the occupant, the images captured by the outside camera 43, data on another mobile body around the vehicle 1, navigation data, and route data based on the navigation data.

In step ST33, the drive ECU 14 may determine whether the hands-on alert has been issued. If the alerting apparatus 87 has outputted the hands-on alert, or if the occupant monitoring apparatus 81 has outputted the hands-on alert request, the drive ECU 14 may determine that the hands-on alert has been issued, and advance the process to step ST34. Otherwise, the drive ECU 14 may advance the process to step ST36.

In step ST34, the drive ECU 14 may determine whether the occupant is in the hands-on state of being able to start a manual operation immediately, on the basis of the detection value of the hands-on sensor 44. If the occupant is in the hands-on state, the drive ECU 14 may advance the process to step ST36. If the occupant is not in the hands-on state even after the alerting, the drive ECU 14 may advance the process to step ST35.

In step ST35, the drive ECU 14 may execute automatic deceleration and stop control for the vehicle 1 to safely stop. The drive ECU 14 may decelerate the vehicle 1 that is traveling, while confirming safety around the vehicle 1, and cause the vehicle 1 to stop at a relatively safe place such as a road shoulder. This enables the vehicle 1 to decelerate and stop in a case where the occupant is not in the hands-on state even after the alerting.

In step ST36, the drive ECU 14 may determine whether automatic traveling based on the automatic driving is executable. For example, if autonomous automatic traveling is executable in a state in which navigation data, route data based on the navigation data, and data on another mobile body around the vehicle 1 are present and reliable traveling stability including support by the occupant is achievable, the drive ECU 14 may determine that the automatic traveling based on the automatic driving is executable, and advance the process to step ST37. Otherwise, the drive ECU 14 may advance the process to step ST39.

In step ST37, the drive ECU 14 may execute autonomous automatic traveling control.

In step ST38, the drive ECU 14 may output a hands-off request to the vehicle network 25, owing to the vehicle 1 being in a state of the automatic traveling based on the automatic driving.

The alarm 88 may acquire and output the hands-off request via the vehicle network 25. This enables the occupant to, for example, remove the hands from the steering wheel 31.

In step ST39, the drive ECU 14 may output a hands-on request to the vehicle network 25, due to the vehicle 1 becoming unable to execute the automatic traveling based on the automatic driving.

The alarm 88 may acquire and output the hands-on request via the vehicle network 25. This enables the occupant to grip the steering wheel 31 with the hands.

In step ST40, the drive ECU 14 may control, on the basis of a driving operation performed by the occupant, the traveling of the vehicle 1 to assist the driving operation.

FIG. 7 illustrates an example of a process of generating and outputting an alert request in a case where a captured image in which a face is unrecognizable has repeatedly occurred.

For the captured image in which the face is unrecognizable, the facial recognition unit 82 may refrain from outputting an availability signal. The looking-aside determination unit 83 and the dozing determination unit 84 may thus refrain from executing the respective processes. In contrast, the continuous loss determination unit 85 and the frequent loss determination unit 86 may execute the respective processes on the basis of repeated occurrence of loss images.

In FIG. 7, time flows from the left to the right.

(A) to (C) of FIG. 7 represent a timing chart illustrating an example of a situation where an image loss in which facial recognition by the facial recognition unit 82 is unsuccessful occurs continuously.

(A) of FIG. 7 illustrates a captured image acquisition cycle. Each arrow corresponds to one cycle at which the inside camera 61 outputs a captured image. The occupant monitoring ECU 17 may execute a process of acquiring the captured image from the inside camera 61, at the imaging cycle indicated by the arrow.

(B) of FIG. 7 illustrates an output signal indicating a result of the recognition by the facial recognition unit 82 for the acquired captured image. In this example, for the first two captured images, the facial recognition unit 82 may output an availability signal indicating successful recognition, as the output signal. For the subsequent three captured images, the facial recognition unit 82 may output an unavailability signal indicating unsuccessful recognition, as the output signal. For the further subsequent three captured images, the facial recognition unit 82 may output the availability signal indicating successful recognition, as the output signal.

(C) of FIG. 7 illustrates an output signal indicating an alert request outputted by the continuous loss determination unit 85 on the basis of continuous image losses.

In this example, the continuous loss determination unit 85 may output the alert request in a case where three or more image losses occur continuously. A period in which three or more captured images are continuously outputted may serve as the continuous loss determination period. The determination threshold for the count value may be three.

(D) to (F) of FIG. 7 represent a timing chart illustrating an example of a situation where an image loss in which facial recognition by the facial recognition unit 82 is unsuccessful occurs intermittently.

(D) of FIG. 7 illustrates the captured image acquisition cycle, as with (A) of FIG. 7.

(E) of FIG. 7 illustrates an output signal indicating a result of the recognition by the facial recognition unit 82 for the acquired captured image. In this example, for the first one captured image, the facial recognition unit 82 may output the availability signal indicating successful recognition, as the output signal. For the next one captured image, the facial recognition unit 82 may output the unavailability signal indicating unsuccessful recognition, as the output signal. Thereafter, as the output signal for each captured image, the facial recognition unit 82 may alternately output the availability signal indicating successful recognition and the unavailability signal indicating unsuccessful recognition.

(F) of FIG. 7 illustrates an output signal indicating an alert request outputted by the frequent loss determination unit 86 on the basis of intermittent image losses.

In this example, the frequent loss determination unit 86 may output the alert request in a case where four or more image losses occur intermittently in the most recent frequent loss determination period. The frequent loss determination period may be a period in which seven or more captured images are continuously outputted. The determination threshold for the count value may be four.

The frequent loss determination period may be longer than the continuous loss determination period. The determination threshold for the count value in the frequent loss determination period may be larger than the determination threshold for the count value in the continuous loss determination period. This makes it possible to, in a case where four or more continuous image losses occur, for example, prevent the frequent loss determination unit 86 from outputting the alert request before the continuous loss determination unit 85 does. This enables the continuous loss determination unit 85 to output a significant alert request on the basis of its own determination, without being affected by the output of the alert request by the frequent loss determination unit 86.

In the example embodiment as described above, the inside camera 61 may be configured to capture images of the occupant of the vehicle 1 periodically and repeatedly. On the basis of the images captured by the inside camera 61, the facial recognition unit 82 may first execute the process of recognizing the face or a part of the face, such as the eye, the nose, or the mouth, of the occupant, as a preliminary process. An occupant determination unit, such as the looking-aside determination unit 83 or the dozing determination unit 84, may determine that the occupant is not in the inappropriate driving state, such as looking-aside or dozing, on the basis of the captured image, among the images captured by the inside camera 61, in which the face, for example, is determined as being recognizable by the facial recognition unit 82. This makes it unnecessary for the occupant determination unit to determine that the occupant is not in the inappropriate driving state, such as looking-aside or dozing, on the basis of a poor-quality image captured by the inside camera 61. It is only necessary for the occupant determination unit to determine that the occupant is not in the inappropriate driving state, such as looking-aside or dozing, on the basis of a high-quality captured image among the captured images, on the precondition that the face, for example, of the occupant is captured to be correctly recognizable in the image captured by the inside camera 61. The determination of whether the occupant is in the inappropriate driving state, such as looking-aside or dozing, to be made by the occupant determination unit may be adapted to be suitable for the determination. Accuracy of the determination by the occupant determination unit is thus enhanced to be appropriate for the determination. For example, in a case of determining looking-aside or dozing on the basis of the eye in the captured image, a size or resolution of an image of the eye in the captured image can often be insufficient. It is desired for the occupant determination unit to determine the state of the eye with high accuracy, on the basis of little information on the eye in the captured image. For example, it is desired for the occupant determination unit to make, on the basis of the state, such as a degree of opening or a size of a pupil, of the eye, markedly high-accuracy determination as compared with a case of simply determining whether the eye is detected, for example. At least one embodiment of the technology enables the occupant determination unit to make such high-accuracy determination.

Moreover, in the example embodiment, a loss determination unit, such as the continuous loss determination unit 85 or the frequent loss determination unit 86, may be provided in parallel with the occupant determination unit that is able to make the high-accuracy determination. The loss determination unit generates an alert request, as with the occupant determination unit. For two or more captured images captured by the inside camera 61, the loss determination unit may output the alert request in a case where a captured image in which the facial recognition unit 82 is unable to recognize the face or a part of the face, such as the eye, the nose, or the mouth, keeps occurring repeatedly. This enables the loss determination unit to generate the alert request for the captured image, among the images captured by the inside camera 61, not to be used for the determination by the occupant determination unit. In a case where there is a possibility that the occupant is in the inappropriate driving state, such as looking-aside or dozing, on the basis of the captured image, among the images captured by the inside camera 61, not to be used for the determination by the occupant determination unit, it is possible for the loss determination unit to generate the alert request on the basis of the presence of the possibility, without directly determining the state of the occupant.

For example, for the captured image of the eye on the basis of which the occupant determination unit is unable to make high-accuracy determination, the eye, which is a part of the face, of the occupant may be determined as being unrecognizable by the facial recognition unit 82. Thus, in a case of an image or a situation in which the state of the eye is not directly determinable on the basis of the image, it is possible to generate and output the alert request on the basis of determination made by the loss determination unit. For a low-quality captured image, among the images captured by the inside camera 61, on the basis of which the occupant determination unit finds it difficult to make the determination, it is possible to generate the alert request on the basis of the determination made by the loss determination unit. It is possible for the occupant to address an alert based on the determination made by the loss determination unit, as with an alert based on the determination made by the occupant determination unit. The direct and indirect determination of the driving state of the occupant multilayered by the occupant determination unit and the loss determination unit makes it possible to output the alert in a situation where the alert request is to be generated originally. It is possible to effectively reduce occurrence of events in which the alert request is not generated in a situation where the alert request is to be generated originally.

In another example, a malfunction, for example, of the inside camera 61 makes it difficult to acquire the captured image from the inside camera 61. In such a case, the facial recognition unit 82 may refrain from outputting an availability signal, as with the case where the face is unrecognizable in the captured image. This enables the loss determination unit, such as the continuous loss determination unit 85 or the frequent loss determination unit 86, to generate the alert request, on the basis of repetition of a situation where the captured image is not acquirable from the inside camera 61. In the example embodiment, it is possible to notify, by alerting, the occupant of not only the state of the occupant, but also that an occupant monitoring function based on the image captured by the inside camera 61 is not correctly working.

In the example embodiment, such parallel cooperation processes of the occupant determination unit and the loss determination unit make it possible to, in a case where there is a possibility that the occupant is in the inappropriate driving state, such as looking-aside or dozing, notify the occupant of the possibility by alerting, regardless of the environment or the state of the inside camera 61. In the example embodiment, it is possible to achieve, at high level, both of mutually contradictory desires, i.e., to accurately determine that the occupant is not in the inappropriate driving state, such as looking-aside or dozing, and to reliably output, in a case where there is a possibility that the occupant is in the inappropriate driving state, such as looking-aside or dozing, an alert indicating the possibility. The driving assist system 80 according to the example embodiment is able to achieve, at high level, both of accurate recognition and determination for occupant monitoring in the vehicle 1 and ensuring of high traveling stability, thus being suitably applicable to the vehicle 1.

An occupant alerting apparatus of the vehicle 1 may include the occupant monitoring apparatus 81 and the alerting apparatus 87 and is also expected to achieve effects similar to the above effects.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing example embodiment, the occupant monitoring apparatus 81 and the alerting apparatus 87 may be provided separately and coupled to each other via the vehicle network 25.

In another example, the occupant monitoring apparatus 81 and the alerting apparatus 87 may be integrally provided in the vehicle 1 as one occupant alerting apparatus of the vehicle 1, and the whole occupant alerting apparatus may be coupled to the vehicle network 25. The occupant monitoring apparatus 81 in this case may include the alarm 88, for example.

In at least one embodiment of the technology, the imaging device is configured to capture first captured images of the occupant of the vehicle. On the basis of the first captured images captured by the imaging device, the facial recognition unit first executes the process of recognizing at least a part of the face of the occupant. The occupant determination unit determines the driving state of the occupant, on the basis of a second captured image, among the first captured images acquired from the imaging device, in which at least the part of the face is determined as being recognizable by the facial recognition unit. This makes it unnecessary for the occupant determination unit to determine the driving state of the occupant, on the basis of a poor-quality captured image, among the first captured images, in which the face is unrecognizable, for example. It is only necessary for the occupant determination unit to assume the second captured image, among the first captured images acquired from the imaging device, in which the face of the occupant is captured to be correctly recognizable, and determine the driving state of the occupant on the basis of the high-quality second captured image. The determination of the driving state of the occupant to be made by the occupant determination unit may be optimized for the determination. The accuracy of the determination by the occupant determination unit is expected to be enhanced by the optimized determination. The alarm outputs an alert to the occupant, on the basis of a first alert request generated by the occupant determination unit.

Moreover, in at least one embodiment of the technology, the loss determination unit may be provided in parallel with the occupant determination unit described above. The loss determination unit generates a second alert request, as with the occupant determination unit, in a case where a third captured image, among the first captured images acquired from the imaging device, in which the facial recognition unit is unable to recognize at least the part of the face occurs two or times. This enables the loss determination unit to generate the second alert request for the third captured image, among the first captured images acquired from the imaging device, not to be used for the determination by the occupant determination unit. In a case where there is a possibility that the occupant is in the inappropriate driving state, such as looking-aside or dozing, on the basis of the third captured image not to be used for the determination by the occupant determination unit, it is possible for the loss determination unit to generate the second alert request on the basis of the presence of the possibility, without directly determining the state of the occupant on the basis of the captured image. Such parallel cooperation processes of the occupant determination unit and the loss determination unit make it possible to, in a case where there is a possibility that the occupant is in the inappropriate driving state, such as looking-aside or dozing, substantially reliably output an alert indicating the possibility. In at least one embodiment of the technology, in a case where there is a possibility that the occupant is in the inappropriate driving state, such as looking-aside or dozing, it is possible to substantially reliably output an alert indicating the possibility, regardless of the imaging environment or the state of the imaging device.

In at least one embodiment of the technology as described above, it is possible to achieve both of mutually contradictory desires for a process, i.e., to correctly determine that the occupant is in the inappropriate driving state, and to, in a case where there is a possibility that the occupant is in the inappropriate driving state, broadly output an alert indicating the possibility. At least one embodiment of the technology makes it possible to correctly determine the driving state of the occupant as occupant monitoring in the vehicle, and also to prioritize traveling stability by broadly outputting an alert for cases where the occupant is or can be in the inappropriate driving state, thus being suitably applicable to the vehicle.

The facial recognition unit 82, the looking-aside determination unit 83, the dozing determination unit 84, the continuous loss determination unit 85, and the frequent loss determination unit 86 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the facial recognition unit 82, the looking-aside determination unit 83, the dozing determination unit 84, the continuous loss determination unit 85, and the frequent loss determination unit 86. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the facial recognition unit 82, the looking-aside determination unit 83, the dozing determination unit 84, the continuous loss determination unit 85, and the frequent loss determination unit 86 illustrated in FIG. 3.

The invention claimed is:

1. A vehicle driving assist system comprising:
an imaging device configured to capture and output first captured images of an occupant of a vehicle;
an alarm configured to output an alert to the occupant; and
a controller configured to execute control based on the imaging device and the alarm,
wherein the controller includes
a facial recognition unit configured to execute a process of recognizing at least a part of a face of the occupant in the first captured images acquired from the imaging device,
an occupant determination unit configured to determine a driving state of the occupant on a basis of a second captured image among the first captured images acquired from the imaging device, and generate a first alert request in a case where the occupant is not in a state of being able to drive the vehicle, the second captured image being a captured image in which the facial recognition unit is able to recognize at least the part of the face of the occupant, and
a loss determination unit configured to generate a second alert request in a case where a third captured image occurs two or more times among the first captured images acquired from the imaging device, the third captured image being a captured image in which the facial recognition unit is unable to recognize at least the part of the face of the occupant, and
wherein the alarm is configured to output the alert to the occupant on a basis of the first alert request generated by the occupant determination unit and the second alert request generated by the loss determination unit.

2. The vehicle driving assist system according to claim 1, wherein the occupant determination unit is configured to determine whether the occupant is looking aside or dozing, on a basis of a state of an eye included in the face of the occupant in the second captured image.

3. The vehicle driving assist system according to claim 2, wherein
the facial recognition unit is configured to regard, as the third captured image in which the face of the occupant is unrecognizable, at least the first captured image on a basis of which the occupant determination unit is unable to determine the driving state of the occupant, and
the loss determination unit is configured to determine whether the third captured image in which the face of the occupant is unrecognizable has occurred two or more times.

4. The vehicle driving assist system according to claim 2, wherein the loss determination unit is configured to, in a case where the first captured image is not acquirable from the imaging device, assume that the third captured image in which the facial recognition unit is unable to recognize the face of the occupant has occurred, and determine whether the third captured image in which the face of the occupant is unrecognizable has occurred two or more times.

5. The vehicle driving assist system according to claim 2, wherein the loss determination unit is configured to generate the second alert request in a case where a state in which the facial recognition unit is unable to recognize the face of the occupant keeps occurring for the first captured images acquired from the imaging device.

6. The vehicle driving assist system according to claim 2, wherein
the second alert request comprises a third alert request and a fourth alert request,
the loss determination unit includes
a first loss determination unit configured to generate the third alert request in a case where a state in which the facial recognition unit is unable to recognize the face of the occupant keeps occurring continuously, and
a second loss determination unit configured to generate the fourth alert request in a case where the state in which the facial recognition unit is unable to recognize the face of the occupant keeps occurring to be repeated intermittently, and
the alarm is configured to output the alert to the occupant on a basis of the third alert request generated by the first loss determination unit and the fourth alert request generated by the second loss determination unit.

7. The vehicle driving assist system according to claim 6, wherein the second loss determination unit is configured to determine that the state in which the facial recognition unit is unable to recognize the face of the occupant has kept occurring to be repeated intermittently, on a basis of a period that is longer than a period on a basis of which the first loss determination unit determines that the state in which the facial recognition unit is unable to recognize the face of the occupant has kept occurring continuously.

8. The vehicle driving assist system according to claim 2, further comprising a detector configured to detect whether the occupant is in a state of being able to operate an operation member to be operated by the occupant in driving the vehicle, wherein
the alarm is configured to
determine, in a case where the first alert request is generated by the occupant determination unit or the second alert request is generated by the loss determination unit, whether the occupant is in the state of being able to operate the operation member on a basis of a result of the detection by the detector, and
output, to the occupant, the alert calling for the occupant to operate the operation member in a case where the occupant is undeterminable as being in the state of being able to operate the operation member.

9. The vehicle driving assist system according to claim 8, further comprising a traveling control apparatus configured to control traveling of the vehicle, wherein
the traveling control apparatus is configured to cause the vehicle to decelerate or stop in a case where, after the alarm has outputted the alert, the result of the detection by the detector does not change to a result indicating that the occupant is in the state of being able to operate the operation member.

10. The vehicle driving assist system according to claim 1, wherein
the facial recognition unit is configured to regard, as the third captured image in which the face of the occupant is unrecognizable, at least the first captured image on a basis of which the occupant determination unit is unable to determine the driving state of the occupant, and
the loss determination unit is configured to determine whether the third captured image in which the face of the occupant is unrecognizable has occurred two or more times.

11. The vehicle driving assist system according to claim 1, wherein the loss determination unit is configured to, in a case where the first captured image is not acquirable from the imaging device, assume that the third captured image in which the facial recognition unit is unable to recognize the face of the occupant has occurred, and determine whether the third captured image in which the face of the occupant is unrecognizable has occurred two or more times.

12. The vehicle driving assist system according to claim 1, wherein the loss determination unit is configured to generate the second alert request in a case where a state in which the facial recognition unit is unable to recognize the face of the occupant keeps occurring for the first captured images acquired from the imaging device.

13. The vehicle driving assist system according to claim 1, wherein
the second alert request comprises a third alert request and a fourth alert request,
the loss determination unit includes
a first loss determination unit configured to generate the third alert request in a case where a state in which the facial recognition unit is unable to recognize the face of the occupant keeps occurring continuously, and
a second loss determination unit configured to generate the fourth alert request in a case where the state in which the facial recognition unit is unable to recognize the face of the occupant keeps occurring to be repeated intermittently, and
the alarm is configured to output the alert to the occupant on a basis of the third alert request generated by the first loss determination unit and the fourth alert request generated by the second loss determination unit.

14. The vehicle driving assist system according to claim 13, wherein the second loss determination unit is configured to determine that the state in which the facial recognition unit is unable to recognize the face of the occupant has kept occurring to be repeated intermittently, on a basis of a period that is longer than a period on a basis of which the first loss determination unit determines that the state in which the facial recognition unit is unable to recognize the face of the occupant has kept occurring continuously.

15. The vehicle driving assist system according to claim 1, further comprising a detector configured to detect whether the occupant is in a state of being able to operate an operation member to be operated by the occupant in driving the vehicle, wherein the alarm is configured to determine, in a case where the first alert request is generated by the occupant determination unit or the second alert request is generated by the loss determination unit, whether the occupant is in the state of being able to operate the operation member on a basis of a result of the detection by the detector, and output, to the occupant, the alert calling for the occupant to operate the operation member in a case where the occupant is undeterminable as being in the state of being able to operate the operation member.

16. The vehicle driving assist system according to claim 15, further comprising a traveling control apparatus configured to control traveling of the vehicle, wherein the traveling control apparatus is configured to cause the vehicle to decelerate or stop in a case where, after the alarm has outputted the alert, the result of the detection by the detector does not change to a result indicating that the occupant is in the state of being able to operate the operation member.

17. A vehicle driving assist system comprising:

an imaging device configured to capture and output first captured images of an occupant of a vehicle;

an alarm configured to output an alert to the occupant; and a processor configured to:

execute control based on the imaging device and the alarm, recognize at least a part of a face of the occupant in the first captured images acquired from the imaging device, determine a driving state of the occupant on a basis of a second captured image among the first captured images acquired from the imaging device, the second captured image being a captured image in which at least the part of the face of the occupant is recognizable, generate a first alert request in a case where the occupant is determined, on a basis of the driving state of the occupant, as not being in a state of being able to drive the vehicle, and generate a second alert request in a case where a third captured image occurs two or more times among the first captured images acquired from the imaging device, the third captured image being a captured image in which at least the part of the face of the occupant is unrecognizable, wherein the alarm is configured to output the alert to the occupant on a basis of the first alert request and the second alert request.

* * * * *